Patented Feb. 20, 1934

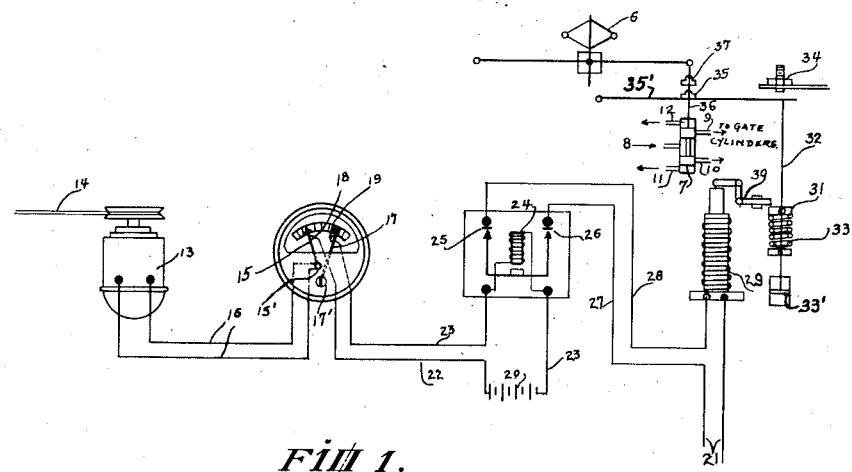

1,947,602

UNITED STATES PATENT OFFICE 1,947,602

GOVERNOR

Samuel Logan Kerr, Philadelphia, Pa., assignor to I. P. Morris and De La Vergne, Inc., a corporation of Delaware Application August 14, 1929. Serial No. 385,733

11 Claims. (Cl. 175—355)

This invention relates to governor apparatus and more particularly to a so-called overspeed governor control which is especially adapted as shown in the specific embodiment of the invention disclosed herein for automatically reducing the speed of a turbine to or near to synchronizing speed or of shutting down the turbine if for any reason the speed thereof should exceed a predetermined maximum value.

Heretofore, it has been customary to use, among other overspeed arrangements, centrifugal governors connected in various ways to control the gate operating motors. Such equipment does not offer that degree of simplicity in either structure or operation which is desired, and also the prior arrangements are relatively expensive.

It is an object of my invention to provide an extremely simple and yet thoroughly reliable overspeed governor control which will be not only simple in construction and operation, but which will be relatively inexpensive to manufacture and install.

A further and more specific object of the invention is to provide an electrically operated overspeed governor control and to have it so coordinated with the usual governor that efficient and effective control of the prime mover such as a hydraulic turbine may be effected.

Other objects and advantages will be seen from the following description of the accompanying drawing in which—

Fig. 1 is a diagrammatic view of the overspeed governor and normal speed governor.

Fig. 2 is a modification thereof, and

Fig. 3 is a vertical section of a hydraulic turbine showing the location of one element of the overspeed governor.

The specific embodiment of the invention chosen for purposes of illustration has been shown specifically in connection with a hydraulic turbine, although it will be understood that the same is applicable to a wide range of prime movers wherein similar operating conditions may be found.

As shown in Fig. 3 a usual type of hydraulic turbine 1 drives a generator 2 by a direct-connected shaft 3. The turbine is provided with usual movable wicket gates operated by two reciprocating servo motors 4. The construction and operation of this equipment is well known so that further detailed disclosure thereof is not necessary and it will also suffice to say that the fluid pressure for actuating the servo motors is normally controlled in accordance with the speed of the turbine through a speed governor 5 having as diagrammatically shown in Fig. 1 a centrifugal governor head 6 operating a distributing valve 7. When the distributing valve rises fluid flows from an inlet 8 through an outlet 9 causing the servo motors 4 to move the gates in a closing direction. At the same time fluid is discharged from one end of the servo motor cylinders through a pipe 10 and discharge 11. When the distributing valve 7 drops fluid is admitted from inlet 8 and through pipe 10 to move the turbine gates in an opening direction and at the same time fluid is discharged from the servo motors through pipes 9 and 12.

Many other devices employed in connection with the usual governor such as primary and secondary restoring mechanisms, etc., are for simplicity omitted from the drawing.

To prevent overspeeding of the prime mover in case the governing mechanism generally described should fail for any reason, or in case of transmission line disturbances I have provided in my improved arrangement speed responsive means in the form of a magneto 13 located near and driven through a belt 14 by the drive shaft 3. It will of course be understood that any other suitable and usual driving connection might be used. As the turbine speed increases the magneto voltage correspondingly increases so as to move to the right a pivoted hand 15 of an electric means responsive to the magneto voltage. This means comprises a usual type of galvanometer diagrammatically indicated at 15' and supplied with current from the magneto by wires 16. An adjustable but normally fixed hand 17 is positioned as by an adjusting screw 17', which may be sealed after adjustment at some predetermined overspeed value, so that when the magneto voltage or turbine speed reaches this predetermined value the hand 15 will have moved over and contact made between contacts 18 and 19 whereby a secondary or relay circuit is energized by current flowing from a battery 20 through wires 22 and 23 to actuate a relay 24 which in turn closes contacts 25 and 26 to pass current from the main line 21 through wires 27 and 28 to actuate a solenoid 29. Actuation of the solenoid 29 moves its core upwardly to release a bell crank operated latch pin 30 from a collar 31 whereupon a rod 32 is moved upwardly by a spring 33 against an adjustable stop 34. Upward movement of rod 32 causes a member 35, carried on a lever 35' and normally slidable on the distributing valve stem 36, to engage a collar 37 fixed to this valve stem thereby moving the distributing valve 7 upwardly to permit passage of fluid from the inlet 8 through pipe 9 thereby causing the servo motors 4 to move the gates in a closing direction and prevent overspeeding of the prime mover.

By properly adjusting the stop 34 and through usual restoring mechanism connected to the left end of link 35' the turbine speed may be brought back only to its synchronizing speed whereupon it will be pulled back into step with the alternating current of the line circuit in case alternators are being driven. The rate at which the speed is returned can be controlled by a suitable adjustable dash pot diagrammatically shown at 33'. During return of the speed toward normal, magneto hand 15 will move away from fixed hand 17 thereby breaking the circuit for solenoid 29 without interfering with continued return of the speed to normal because spring 33 will continue to hold or move stem 32 upwardly, it being noted that once latch 30 is released from collar 31 the solenoid 29 has no further control thereover.

When the latch mechanism 30 has once been released it must be reset before complete control can be reverted to governor 6. This insures stability of operation as the equipment would otherwise resume its normal operation upon any slight decrease in speed below the maximum safe limit after it had once been exceeded. The abnormal condition which caused the excessive speed may not as yet have been corrected and therefore it is not desirable to allow immediate resumption of normal control. To reset the latch mechanism, collar 31 along with rod 32 is moved downwardly against the compression of spring 33 until the bellcrank operated latch 30 is free to be manually moved over the top edge of collar 31. It is seen that if the abnormal overspeed condition has not been corrected that solenoid 29 will remain energized and must prevent resetting of the latch due to the solenoid core engaging one arm of the bellcrank.

In the modification shown in Fig. 2 magneto 13 supplies current to a galvanometer 40 which is so arranged that when the magneto voltage reaches the predetermined overspeed value hand 41 swings to the right to make a closed circuit from the main line 21' through wires 43 and 44, and relay coil 45, thereby closing relay contacts 46 to energize a solenoid 29' by current flowing from the main line 21'. A resistor 47 is inserted in wires 43, 44 to permit using the line current instead of a battery. The normal speed governor mechanism is not disclosed in connection with this Fig. 2 as it would be identical to that shown in Fig. 1. A usual tachometer 48 responsive to the magneto voltage gives a direct reading on a graduated scale of the turbine speed, this also being true of hand 15 in the preferred form.

The instrument contacts 18, 19 and elements controlled thereby are arranged so as to be inoperative except when a predetermined overspeed value is reached but upon reaching said overspeed value the elements then function to bring the turbine speed back to synchronizing speed or to speed no load.

It is thus seen that in either modification I have provided a very simple overspeed governor control and one which is relatively inexpensive, yet efficient and effective in its operation in automatically controlling the prime mover in case the same tends to overspeed.

While I have shown only two specific embodiments of the invention, it is clear that other embodiments may be had and that changes may be made therein without departing from the spirit of the invention as set forth in the appended claims.

I claim:

1. An overspeed governor for a hydraulic prime mover comprising an electrical element constantly movably driven by the prime mover, means for controlling said prime mover when a predetermined speed thereof is reached including an electrical circuit connected with said electrical element, and releasable means controlled by said circuit and adapted when initiated to operate to its full extent and remain operative to that extent independently of further variations in the prime mover speed.

2. An overspeed governor for a hydraulic prime mover adapted to operate at a normal speed, comprising a magneto driven by the prime mover whereby the magneto voltage varies directly in accordance with the speed of the prime mover, electrical means responsive to the voltage of said magneto, a secondary circuit, means whereby when the magneto voltage reaches a predetermined value in excess of said normal speed said secondary circuit is energized, and adjustable means adapted upon energization of said secondary circuit to return said prime mover to either speed-no-load or less and retain the adjusted speed irrespective of further operating conditions.

3. An overspeed device for a prime mover adapted to operate at a normal speed, comprising a magneto driven thereby whereby the magneto voltage varies in accordance with the speed of the prime mover, means for controlling the supply of power medium to said prime mover, a servo-motor for controlling said mean, a distributing valve for said servo-motor, mechanism for controlling said distributing valve, and means responsive to a predetermined value of the magneto voltage, in excess of said normal speed, for effecting operation of said controlling mechanism.

4. An overspeed governor for a prime mover adapted to operate at a normal speed comprising a magneto driven by a prime mover whereby the magneto voltage varies in accordance with the speed thereof, an electrically responsive member adapted to move in accordance with variations in the magneto voltage, an electrical circuit adapted to be closed when said responsive member moves to a predetermined position in accordance with a predetermined magneto voltage, and operating means including a latch mechanism rendered operative by the closure of said circuit to prevent overspeed of the prime mover above a predetermined value in excess of said normal speed whereby said operating means upon once being initiated remains operative irrespective of subsequent changes in magneto voltage.

5. The combination set forth in claim 4 further characterized in that said circuit includes a solenoid and a relay mechanism for closing the circuit therefor.

6. The combination set forth in claim 4 further characterized in that said circuit includes a solenoid and a relay mechanism for closing the circuit therefor, and means whereby said solenoid circuit and relay are energized from a common circuit.

7. The combination set forth in claim 4 further characterized in that said operating means includes a releasable member, and means for releasing the same automatically when the overspeed value is reached.

8. The combination in a governor system for a prime mover comprising a governor for controlling the normal speed variations of the prime mover, an overspeed governor having speed responsive means driven by the prime mover, an electrical element controlled by said speed responsive means, an electrical circuit controlled by said electrical element, and means adapted, when once initiated, to act upon an element of said normal speed governor independently of subsequent speed changes, said means being rendered operative automatically in accordance with the control of said circuit.

9. In combination, a prime mover, means for controlling said prime mover including a pilot valve and restoring mechanism therefor, and an overspeed governor comprising a magneto driven by the prime mover, a member responsive to variations in voltage of said magneto, means adapted to be adjusted for a predetermined overspeed of the prime mover, and means including a circuit associated with said adjustable means adapted to control said pilot valve independently of said restoring mechanism and thereby control the speed of the prime mover when said electrically responsive member reaches the predetermined overspeed position of said adjustable means.

10. A governor for a hydraulic prime mover comprising a speed responsive device, means actuated thereby when a predetermined value of overspeed is reached to reduce the prime mover speed, and means whereby the speed is reduced only to substantially speed no-load and remains at said speed irrespective of further changes in the operating conditions.

11. A governor for a hydraulic turbine having gate mechanism and a speed responsive magneto driven by said turbine whereby the magneto voltage varies in accordance with the speed of the turbine, means adapted to be actuated when a predetermined value of magneto voltage corresponding to a given overspeed is reached, and means controlled by said actuated means for actuating said gates whereby the speed of the turbine is reduced to substantially a predetermined speed below said overspeed and is substantially maintained at said reduced speed irrespective of further changes in the operating conditions.

SAMUEL LOGAN KERR.